May 18, 1954     R. L. MANGRUM     2,678,737
PORTABLE CONTAINER
Filed Sept. 27, 1949     2 Sheets-Sheet 1
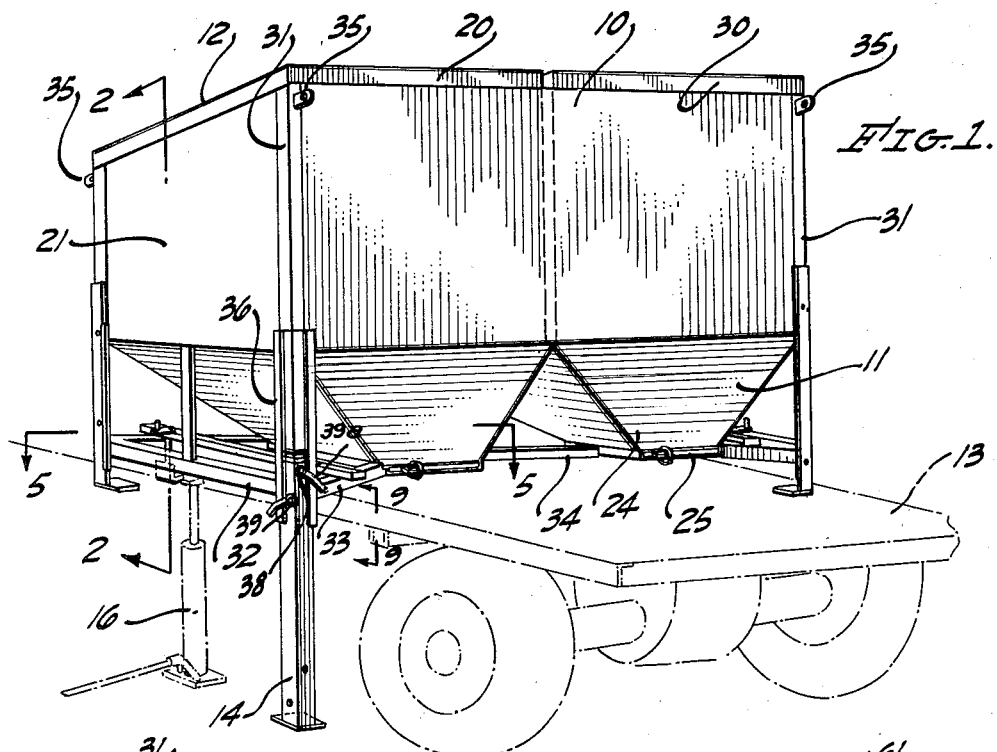
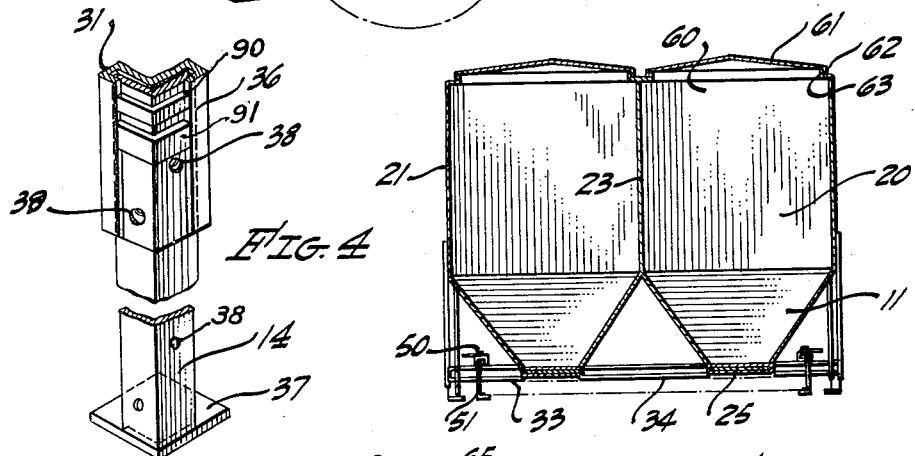
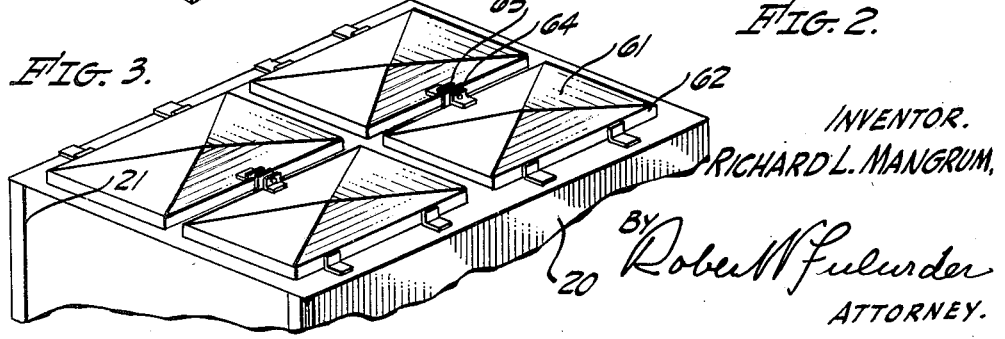
INVENTOR.
RICHARD L. MANGRUM,
BY Robert W Fulwider
ATTORNEY.

May 18, 1954   R. L. MANGRUM   2,678,737
PORTABLE CONTAINER
Filed Sept. 27, 1949   2 Sheets-Sheet 2
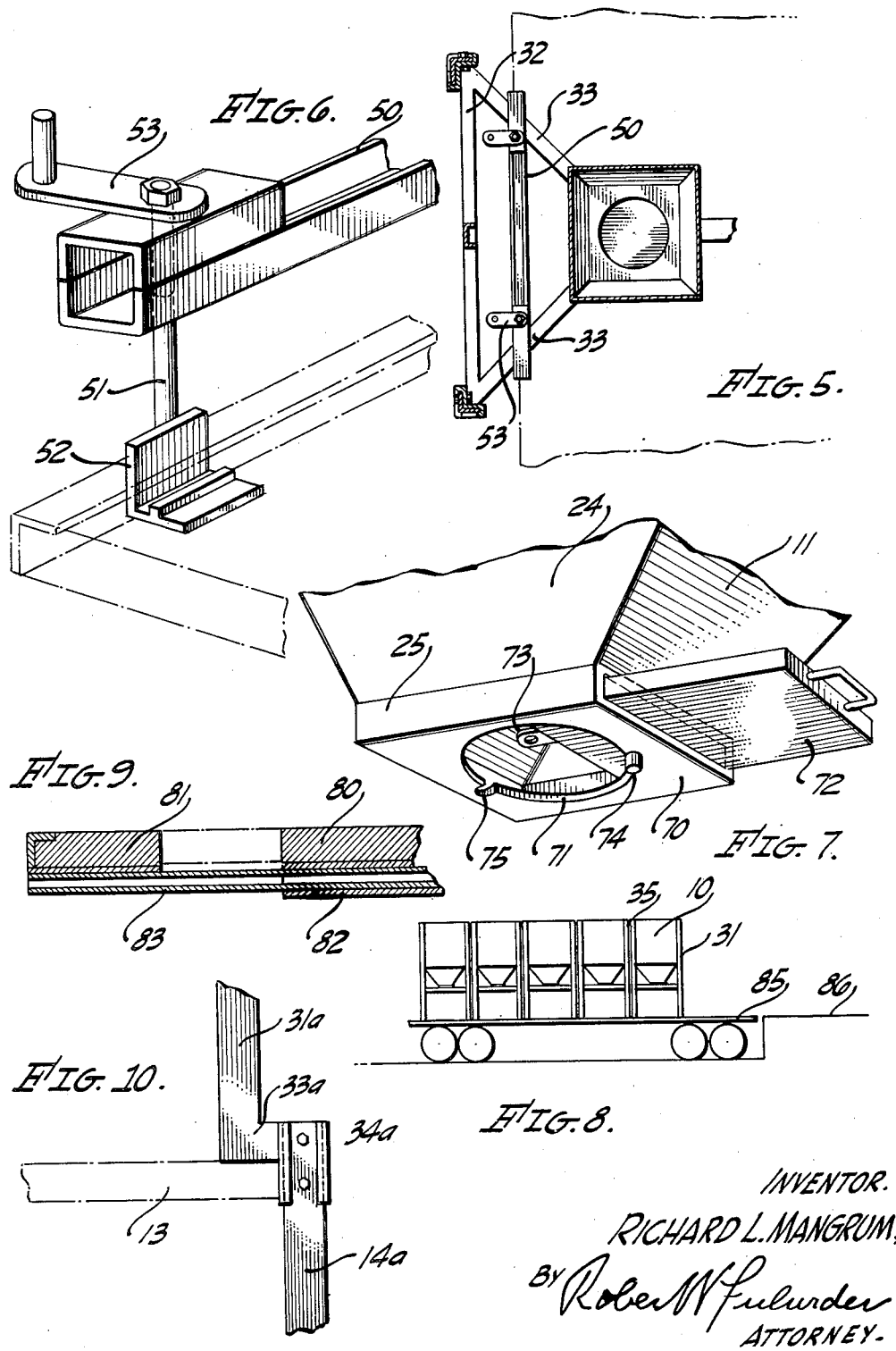
INVENTOR.
RICHARD L. MANGRUM,
BY Robert W Fulwider
ATTORNEY.

Patented May 18, 1954

2,678,737

UNITED STATES PATENT OFFICE 2,678,737

PORTABLE CONTAINER

Richard L. Mangrum, Long Beach, Calif.

Application September 27, 1949, Serial No. 118,171

11 Claims. (Cl. 214—17)

My invention relates generally to containers or bins, and more particularly to a portable feed bin adapted to be easily transported, and to serve as a storehouse after delivery.

In modern farming or ranching, the farmer often purchases large quantities of grain or other food to feed his livestock. For many years, all such material was packed in sacks or bags, loaded for transporting, delivered, unloaded, stored, and finally taken to the feeding area. Each of these steps necessarily involves a great amount of manual labor; many hazards such as breakage, rain and water damage, rats, mice and the like; and many expenses such as the cost of a suitable warehouse.

Consequently, in large scale farming, it has become popular to build bulk storage bins or tanks on the farm in a suitable feeding area. A conveyor truck of large capacity is then brought periodically to the farm to replenish the grain supply. These trucks are equipped with blowers or screw conveyors and the loading operation is accomplished with a minimum of manual drudgery. As is apparent, such an operation has many advantages over the older method. However, there are inherent disadvantages in such a system which render it costly and impractical for the small farmer, and likewise for the small feed supplier.

Both the bulk storage bins and the conveyor trucks require a large capital investment. Furthermore, conveyor trucks are expensive to operate and susceptible to many mechanical difficulties. For these reasons, the bulk storage system has heretofore been restricted to large scale operations.

By the use of my portable bins, any amount of feed can be conveniently shipped directly to the desired location on the farm. No heavy manual labor is required, and no expensive conveyor trucks are needed. A relatively inexpensive flat bed truck is used in the final step of transporting the bins, and when positioned, the bins serve as a storehouse for the feed. When the supply of grain or other material in a bin becomes low, the feed supplier brings out a full bin and places it in a position desired by the rancher. The supplier at that time picks up the empty bin and returns it to the mill where it is refilled. As will hereinafter be explained, the complete operation is extremely simple, and it is apparent that it is highly advantageous.

It will be apparent that the bins may be used for other purposes than the moving and storing of grain, as any bulk material may be similarly moved and stored by their use. The description of the particular application of my invention to grain handling is cited merely to illustrate the advantages of my invention in handling bulk material.

A major object of my invention is to supply a container that can be removably placed and transported on a flat bed truck or vehicle, and after the container has been delivered to the desired location may, by a simple manual operation, be disengaged from the truck and placed in a stationary position until the material situated in the container has been emptied therefrom. The empty container by reversing the above operation may be placed in a movable position on a flat bed truck, and returned to the mill or supplier to be filled.

A further object of my invention is to provide a portable container which is designed so as to be easily transported without requiring expensive handling equipment or heavy manaul labor.

A still further object of my invention is to provide a portable container which is completely weatherproof and fireproof in order that the container can be placed outside to serve as a storehouse.

Yet another object of my invention is to provide a portable container which is durably and economically constructed to withstand hard usage, is of a convenient size, and is adapted to be removably affixed to similar units when being transported on railroad flat cars.

These and other objects and advantages of my invention will become apparent from the following detailed description of preferred and modified forms thereof, and from an inspection of the accompanying drawings in which:

Figure 1 is an overall perspective view of a preferred form of the bin shown resting on a truck bed with one leg having been lowered to the ground level;

Figure 2 is a vertical cross section through the bins, taken along the line 2—2 of Figure 1;

Figure 3 is a perspective view of the upper portion of the preferred bin showing the hinged lids thereon;

Figure 4 is a detail of a leg of the bin and the locking means thereon;

Figure 5 is a partial plan and horizontal cross-sectional view of the bin supporting structure taken along the line 5—5 of Figure 1;

Figure 6 is a detail of the clamping device on the supporting structure with the truck bed shown in phantom outline;

Figure 7 is a partial perspective view of the bottom closure on the bin;

Figure 8 is an elevational view showing the arrangement of several bins connected together as a unit for transportation on a railroad flat car;

Figure 9 is a partial cross-sectional view of a preferred truck bed for use with the bin, taken along the line 9—9 of Figure 1; and, Figure 10 is a partial elevational view of a modified form of leg and supporting structure.

Referring now to the drawings, and particularly to Figure 1 thereof, the numeral 10 indicates a generally rectangular bin or tank which is internally divided into two separate compartments, each of which has a hopper type bottom 11. Surrounding the tank 10 is an open framework 122 adapted to support the bin on a truck bed 13 shown in phantom outline. The corner posts of the framework 12 each carries a vertically adjustable leg member 14 which overhangs the truck bed 13 and may be directed downwardly to stand on the surface beneath the truck bed. Also shown in phantom outline is a conventional jack 16 which is adapted to raise the truck bed 13 with respect to the supporting structure beneath the truck wheels, at which time all of the legs 14 are lowered and locked in position so as to support the bin 10. As will be hereinafter explained the supporting framework 12 is then freed from the truck bed 13 by the jack 16 being lowered which causes the truck bed 14 to drop lower than the supporting framework 12 and be disengaged therefrom. The truck is then driven forwardly and the bin 10 left standing in the desired position supported on the legs 14.

Considering now the details of construction, it will be seen that the bin 10 comprises generally vertical end walls 20 and side walls 21 joined together in a rectangular shape, and forming with the hopper bottoms 11 a box-like container suitable for holding grain or a like material therein. Spaced laterally midway between the side walls 21 is an internal wall or divider 23, as is best seen in Figure 2, to create within the bin 10 two separate compartments to which are attached the hopper bottoms 11. Each of the hopper bottoms 11 is an inverted pyramidal frustum having inwardly and downwardly convergent hopper shape. Beneath the hopper bottom 11 is a suitable horizontal gate member 25 the detailed structure of which will hereinafter be explained adapted to be slidably opened or closed to permit the material contained within the compartments of the bin 10 to be discharged therefrom. As can be seen, the end walls 20 extend across the width of the truck bed 13 so that the side walls 21 overhang slightly over the edges of the bed. The purpose of dividing the bin 10 into two compartments by the wall 23 is to provide storage for two separate types of material, and it will, of course, be appreciated that the bin 10 may be formed as a single compartment or with more compartments if desired. In the preferred form of the device, I construct the bin 10 from a suitable lightweight material such as sheet metal, and all of the edges and seams thereof are joined by welding so as to provide a lightweight and durable structure, which is both waterproof and fireproof.

The open framework 12 that surrounds the bin 10 is preferably formed of commercially available structural members such as angle iron to create a horizontal upper frame 30 that is welded or otherwise rigidly affixed to the upper edges of the bin 10. Extending vertically downwardly from the frame 30 are corner posts 31 of L-shaped cross section that are affixed to both the frame and to the walls 20 and 21. At the lower end of the corner posts 31, horizontal side members 32 are attached, as are base members such as diagonal braces 33 which extend horizontally inwardly, as is best seen in Figures 1 and 5, to support the lower ends of the hopper bottoms 11. The diagonal braces 33 are attached rigidly on the hopper bottoms 11 and are displaced slightly below them, as is best seen in Figure 2 so that the gate members 25 are spaced slightly above the truck bed 13 when the diagonal braces are resting thereon. Other suitable bracing can of course be used, and in the preferred form, I use a horizontal spacer 34 between the adjacent inner sides of the hopper bottoms 11. As can be seen, the framework 12 protects and strengthens the bin 10, and also serves as a support therefor which is adapted to rest on the truck bed 13 in order that the weight of the loaded bin 10 is supported on the framework 12 and not on the light walls of the bin. Near the top of each corner post 31 an ear or apertured plate 35 is rigidly mounted so as to project generally outwardly and parallel to the side frames 32. As will be hereinafter explained, the ears 35 provide a convenient interlocking means to connect a plurality of bins 10 into a single unit.

Suitably attached on the lower portion of the corner posts 31 are vertical tracks 36 in which each leg member 14 is slidably mounted. As is best seen in Figure 4, the leg member 14 is of right angular cross section and overlaps the corner posts 31, being guided and constrained thereon by the tracks 36 which are formed as L-shaped flanges along the edges of the corner posts. On the bottom of the legs 14 is a rectangular foot pad 37 adapted to rest on the ground or other supporting surface. Other foot members, can of course be used, such as casters or wheels, so as to allow movement of the bin 10 around the feeding area, the simple pad 37 shown herein being preferred because of its economical construction.

Near the upper and lower ends of the leg members 14 are sets of spaced bolt holes 38 adapted to have bolts 39 passed therethrough to enter similarly spaced holes in the lower end of the corner posts 31. Locking nuts (not shown) are welded or mounted on the rear surface of the corner posts 31 and are adapted to engage the threaded ends of the bolts 39 and firmly lock the legs 14 in position. When the bolts 39 are passed through the upper set of holes, the legs 14 are locked in the downwardly extended position to support the weight of the bin 10, as is best seen in Figure 4. When the bolts 39 are passed through the lower set of holes in the legs 14, the latter are raised to a position adjacent the truck bed 13 where they ride during transportation, this position being shown in Figure 2. I have provided herein a very simple and positive means for locking the legs 14 either in the up or down position, and it is to be understood that other types of locking means can be used if desired, the form shown herein being preferred since it provides a rigid and positive lock.

It will be remembered that the bin 10 is either supported on the legs 14 or on the truck bed 13. When the bin 10 is seated on the bed 13, it is highly desirable that it be firmly secured thereon to prevent any possibility of sliding off or being displaced while being transported. I have provided a novel clamping device which secures the bin 10 to the truck bed 13, and is quickly removable prior to the jacking operation, so that the bin is freed from the truck bed as the bed is lowered. Thus, the bin 10 is positioned on the ground to stand on the leg members 14. As is best seen in Figures 5 and 6, a holding bar 50 is adapted to ride over the diagonal braces 33 and bear firmly thereagainst, clamping the inner ends of the braces 33 between the truck bed 13 and the bar 50. A pair of upstanding studs 51 have their lower ends firmly attached to the truck bed 13, and in the preferred form, each stud 51 is welded on the side of a cleat 52 of angular section having its base secured beneath the truck bed 13 and its side wall abutting the edge of the bed. The studs 51 are spaced near the end of the holding bar 50 and the latter has openings therein adapted to ride freely over the ends of the studs. As is best seen in Figure 6, the holding bar 50 is of channel shaped cross section and has an inverted channel section welded near the ends thereof so as to form a box-like girder with the vertical openings therein to permit passage of the studs 51. The upper ends of the studs 51 are threaded and after the locking bar 50 is dropped over the studs a threaded crank arm 53 is caused to engage the upper end of each stud 51 to draw the holding bar 50 downwardly. As can be understood, rotation of each of the cranks 53 forces the holding bar 50 downwardly with considerable pressure against the braces 33 so that the bin 10 is secured firmly to the truck bed 13. When the truck has arrived at its destination, the crank arms 53 and the holding bars 50 are removed, and the bin 10 is then free to be disengaged from the truck bed 13. In Figure 5, a single holding bar 50 is shown adjacent one side of the truck bed 13, but it will be understood that a similar clamping device is also used on the other side of the truck bed 13 as can be seen in Figure 1.

Turning to the construction of the bin 10, as can best be seen in Figures 2 and 3, the top of the bin has a plurality of generally rectangular openings 60 therein to allow convenient filling at the mill. In the preferred form, there are two openings 60 in each compartment of the bin 10, and each is provided with a generally rectangular cover or lid 61 hinged to open outwardly toward the bin end walls 20. The lid 61 is formed of a light sheet material and may have an arched center section to provide rigidity and better drainage. On the edges of the lid 61 are downwardly turned flanges 62 adapted to bracket similarly upturned flanges 63 formed around the edges of the openings 60 and create a tight, leakproof joint. The adjacent swinging edges of the lids 61 each carry a central apertured plate 64 which is adapted to register with a similar aperture plate 65 mounted on the top of the bin 10 between the covers 61. A conventional sealing or latching means can then be passed through either or both of the aperture plates 63 and the plate 65 so as to prevent tampering with the contents of the bin 10.

On the lower end of the bin 10, the previously mentioned gate members 25 are welded or otherwise firmly attached to the tapered walls 27 of each hopper bottom 11. A box-like frame 70 is joined at its upper edges to the walls 24 and is disposed generally horizontally, having a relatively large outlet opening 71 therein, as is best seen in Figure 7. One of the vertical sides of the frame 70 is slotted and a closure member formed as a pan or tray 72 is slidably mounted therein, being movable inwardly to register with and close the discharge opening 71. The tray 72 has on its inner end an apertured tongue 73 which extends through a slit in the opposite side of the frame 70 when the tray 72 is fully closed. A locking member (not shown) can then be passed through tongue 73 to prevent any movement of the tray 72 during transportation. On the bottom of the tray 72 is a small stop member 74 adapted to engage notches 75 formed on the edge of the opening 71 to prevent pulling the tray 72 completely out of the frame 70, or pushing it so far in as to cause a jamming thereof. As can be seen, all of these features are provided with a minimum of construction as it is an object of my invention to provide a lightweight and economical structure.

The operation of the structure is apparent from its simplicity. After the bin 10 has been loaded with bulk material at the mill, it is standing on the leg members 14 at such a distance from the ground that the truck bed 13 can be moved under bin, and the bed then jacked or otherwise raised upwardly to take the weight from the leg members 14. The leg members 14 are then raised and locked in their upper position where they ride during transportation. When the destination is reached, the truck bed 13 is again jacked up, and the legs 14 are lowered and locked to support the weight of the bin 10. Then the truck bed 13 is lowered, and is free to be moved from beneath the bin 10 by driving the truck forwardly.

As is well known, the maximum width for a vehicle in many states is eight feet, and for that reason I use a truck bed 13 of less width than is normally employed in order that the bins when positioned thereon, or the legs 14 mounted on the bins, will not exceed the maximum width. A truck bed 13 of less width than normal that can be used in transporting the bins 10 is shown in Figure 9, yet by a simple manual operation the bed can be transformed to one of a normal width whereupon the flat bed truck can be used for purposes other than transporting the bins. The numeral 80 indicates the outer portion of a truck bed which is considerably narrower than the maximum lawful width. Slidably mounted on each side of the bed 80 is an extension or plank 81 which normally abuts the bed to form a continuous platform. Tracks 82 are mounted beneath the bed 80 and supporting frames 83 are slidably mounted therein to allow the planks 81 to be moved outwardly and remain parallel to the edges of the bed 80. Spacer planks (not shown) are then placed between the planks 81 and the bed 80 so as to increase the width of the platform. When it is desired to transport a bin 10, the bed is used in the narrow width; when it is desired to use the truck for other general purposes, the width of the bed is increased to form a full sized flat bed.

In Figure 8, a plurality of bins 10 are shown loaded as a unit on a conventional railroad flat car 85 shown drawn up to a loading dock 86 where they can be conveniently removed by a truck. During the transportation on the car 85, it is desirable that the bins 10 be locked together, and for this purpose I have provided the previously mentioned apertured ears 35. As is best seen in Figures 1 and 8, the ears 35 extend outwardly from corner posts 31 away from the end walls 20, the sets of ears being spaced slightly wider on one end wall than on the other end wall of the same bin, so that when the bins 10 are placed in end to end relationship, as shown in Figure 8, the ears on one end wall lie adjacent to those on the end wall of the next bin, and the apertures in the ears are adapted to register. A horizontal locking bar (not shown) is then passed through all of the ears 35 and the bins 10 are conveniently locked together.

Other modifications and changes in the construction can, of course, be made by those skilled in the art, such as the modified leg members 14a and corner posts 31a shown in Figure 10, by which the use of the horizontal base members 33 can be eliminated. Each corner post 31a has a step 33a thereon which is adapted to ride on the truck bed 13, the outer ends of the steps overhanging the bed at 34a to form tracks for the leg members 14a. As can be seen, the construction is somewhat lighter than that of the preferred form, and under some conditions, may be desired.

For convenience in operation I have found it desirable to provide each of the bolts 39 on the head portion thereof with an outwardly extending handle 39a. Thus, the bolts 39 may be removed or inserted to hold the legs 14 in the desired position without the use of auxiliary tools such as a wrench. In addition, to align the bolt holes 38 after the legs 14 have been placed in the lower position, each of the legs preferably has an L-shaped lug 90 welded to the exterior surface thereof. As each of the legs 14 is lowered the lug 90 engages an L-shaped stop 91 affixed to the corner post 31 with which it is associated, with the stop 91 so positioning the leg 14 that the bolts 39 can be inserted through the holes 38. I therefore wish it to be understood that I do not limit myself to the details of construction shown herein, except as defined in the appended claims.

I claim:
1. A portable bin structure capable of being removably mounted on the flat bed of a truck which includes: a generally rectangular storage bin having a top intake opening sealing with a water-tight lid member, and an inwardly tapered bottom portion having a slidable closure member thereon to register with a discharge opening in said bottom portion; an outer framework attached to said bin for rigidly supporting the latter on the bed of said truck, said framework comprising an upper frame around the top edges of said bin, generally vertical corner posts extending downwardly from said upper frame and overhanging the sides of said truck bed, and horizontal braces extending inwardly from said corner posts to the tapered bottom portion of said bin; a plurality of threaded studs spaced along to be mounted on each lateral edge of said truck bed to extend generally upwardly adjacent said horizontal braces; a plurality of cleats affixed to said studs that underlie said bed and engage portions of the lower surface thereof; two slotted holding bars, with each of said bars adapted to fit over one set of said studs to override said horizontal braces; threaded crank arms to engage said studs and draw said holding bars downwardly against said braces and hold said framework stationary relative to said truck bed; a plurality of vertically adjustable leg members with each of said members slidably mounted on one of said corner posts and of sufficient length to stand on the ground when said truck bed has been raised; and locking means to hold said leg member in the downwardly extended position to support said container when said truck bed is subsequently lowered.

2. A portable storage bin that may be removably mounted for transportation on the flat bed of a vehicle which includes: a generally rectangular storage bin having a top intake opening sealing with a water-tight lid member, and an inwardly tapered bottom portion having a movable closure thereon to register with a discharge opening in said bottom portion; framework attached to said bin for rigidly supporting said bin, said framework comprising an upper frame extending around the top portion of said bin in a substantially horizontal plane, generally vertical corner posts extending downwardly from said frame, a plurality of braces extending inwardly from said corner posts to said tapered bottom portion, with said braces capable of resting on the upper surface of the flat bed of a truck to support the weight of said bin thereon; a plurality of rigid bars removably mounted on said braces; a plurality of threaded members that removably engage said bars and extend downwardly therefrom; engaging means disposed on the lower ends of said members which underlie lateral edge portions of said truck bed; threaded means that engage said threaded members, said means when tightened causing said braces to be gripped between said bars and bed to hold said bin in a stationary position on said bed; a plurality of vertically adjustable leg members, with each of said leg members slidably supported from said bin in a position that overhangs the flat bed of a vehicle when said bin is mounted thereon, and of sufficient length to stand on the ground to support said bin after said bed and bin have been moved vertically relative to one another to cause their separation; and locking means to hold said leg member in a downwardly extending position to support said bin on the ground when said bin is not mounted on the flat bed of a vehicle, and to maintain said leg members in an elevated position when said bin is removably supported on the flat bed of a vehicle.

3. A portable storage bin that may be removably mounted for transportation on the flat bed of a vehicle which includes: a completely enclosed storage bin having a top intake opening sealing with a water-tight lid member, and an inwardly tapered bottom portion; a framework attached to said bin for rigidly supporting said bin, said framework comprising a frame that extends around the upper portion of said bin in a substantially horizontal plane from which a plurality of corner posts extend downwardly, and horizontal braces that extend inwardly from said corner posts to said tapered bottom portion to reinforce said framework and serve as a support for the weight of said bin when said bin is mounted on the flat bed of a vehicle; a plurality of rigid bars removably mounted on said braces; a plurality of threaded members that removably engage said bars and extend downwardly therefrom; engaging means disposed on the lower ends of said members which underlie lateral edge portions of said truck bed; threaded means that engage said threaded members, said means when tightened causing said braces to be gripped between said bars and bed to hold said bin in a stationary position on said bed; a plurality of vertically adjustable leg members, with each of said leg members slidably supported from said bin in a position that overhangs the flat bed of a vehicle when said bin is mounted thereon, and of sufficient length to stand on the ground to support said bin after said bed and bin have been moved relative to one another in a vertical direction to cause their separation; and locking means to hold said leg member in a downwardly extending position to support said bin on the ground, and to maintain said leg members in an elevated position when said bin is removably supported on the flat bed of a vehicle.

4. A portable storage bin that may be removably mounted for transportation on the flat bed of a vehicle: a completely enclosed substantially rectangular storage bin having a top intake opening sealing with a water-tight lid member, and an inwardly tapered bottom portion having a movable closure thereon to register with a discharge opening in said bottom portion; a plurality of generally vertical corner posts mounted on said bin; a plurality of horizontally disposed braces that extend between said corner posts and said tapered bottom and serve to reinforce said bin and provide a support for said bin when said bin is removably positioned on the flat bed of a vehicle; a plurality of rigid bars removably mounted on said braces; a plurality of threaded members that removably engage said bars and extend downwardly therefrom; engaging means disposed on the lower ends of said members which underlie lateral edge portions of said truck bed; threaded means that engage said threaded members, said means when tightened causing said braces to be gripped between said bars and bed to hold said bin in a stationary position on said bed; a plurality of slidably adjustable leg members supported from said bin in a position that overhangs said flat bed when said bin is mounted thereon, and of sufficient length to stand on the ground to support said bin after said bed and bin have been moved relative to one another in a vertical direction to their separation; and locking means to hold said leg member in a downwardly extending position to support said bin when said bed is removed from a bin supporting position, and to maintain said leg members in an elevated position when said bin is removably supported on said bed.

5. A portable storage bin that may be removably mounted for transportation on the flat bed of a vehicle: a generally rectangular storage bin having an inwardly tapered bottom portion; an outer framework attached to said bin for rigidly supporting said bin, said framework comprising an upper frame that extends around the upper portion of said bin, generally vertical corner posts extending downwardly from said upper frame, and each of said corner posts having an outwardly extending horizontal offset member on the lower end thereof that supports said bin when said bin is removably mounted on the bed of a vehicle; a plurality of vertically adjustable leg members, with each of said leg members movably supported from the outer end portions of one of said offset members in a position to overhang the flat bed of a vehicle on which said bin is removably mounted, and of sufficient length to stand on the ground to support said bin after said bed and bin have been moved relative to one another in a vertical direction to cause their separation; and locking means to hold said leg member in a downwardly extending position to support said bin when said bed is removed from a bin supporting position, and to maintain said leg members in an elevated position when said bin is removably supported on said bed.

6. A device to lock a portable storage bin in a rigid transporting position on the flat bed of a vehicle which includes: a substantially rectangular storage bin with a tapered bottom, corner posts mounted on the vertical corners thereof, and horizontal braces extending between said posts and bottom capable of removably supporting said bin on said bed; a plurality of elongated rigid members capable of being longitudinally positioned parallel to the lateral edges of said bed when said bin is removably mounted thereon, and each of said members resting on a portion of said braces a plurality of substantially vertical threaded studs spaced along the two lateral edge portions of said bed; means mounted on said studs that underlie and engage portions of the lower lateral edge surfaces of said bed; and manually operable threaded means that engage said studs and said rigid members, with said means when rotated in one direction forcing said members downwardly to grip said braces between the upper surface of said bed and the lower surfaces of said members to hold said bin in a rigid position on said bed, and when rotated sufficiently in the opposite direction, becoming disengaged from said studs to permit said members to be removed from a brace holding position on said studs, and said bin removed from said bed.

7. A portable structure of the class described for removably mounting on the flat bed of a truck which includes: a completely enclosed storage bin having a top intake opening sealing with a water-tight lid member, and an inwardly tapered bottom portion having a movable closure thereon to register with a discharge opening in said bottom portion; a framework attached to said bin for rigidly supporting said bin, said framework comprising a frame that extends around the upper portion of said bin from which a plurality of corner posts extend downwardly, and horizontal braces that extend inwardly from said corner posts to serve as a support when said bin is mounted on the flat bed of a truck; a plurality of substantially vertical members capable of being disposed in longitudinally spaced relationship along each lateral edge of said flat bed; a plurality of elongated rigid members capable of being removably mounted on the upper surfaces of said braces, and each of said elongated members adapted to removably engage said vertical members situated on the side of said bed on which said elongated member is positioned; manually operated means operatively associated with said vertical members which may be actuated after said elongated members are in engagement with said vertical members to force said elongated members downwardly to grip said braces between said elongated members and said bed to maintain said bin in a rigid transporting position thereon, and said manually operated means capable of being removed from operative association with said vertical members to permit said elongated members to be disengaged from said vertical members whereby said braces are free to move vertically and said bin can be removed from said bed; a plurality of vertically adjustable leg members, with each of said leg members slidably supported from said bin in a position that overhangs said flat bed on which said bin is mounted, and of sufficient length to extend to the ground and support said bin after said bed and bin have been moved relative to one another in a vertical direction to cause their separation; locking means to hold said leg member in a downwardly extending position to support said bin on the ground when said truck is removed from a pin supporting position, and to maintain said leg members in an elevated position when said bin is removably supported on said bed, and stop means to prevent said legs from becoming inadvertently separated from said bin.

8. A portable structure of the class described capable of being removably mounted on the flat bed of a vehicle which includes: a completely enclosed storage bin having a top intake opening sealing with a water-tight lid member, and an inwardly tapered bottom portion; a plurality of spaced downwardly extending posts affixed to said bin; a plurality of horizontal braces that extend inwardly from said posts to said tapered bottom portion to reinforce said framework and serve as a support when said bin is mounted on the flat bed of a vehicle; a plurality of substantially vertical threaded studs capable of being disposed in longitudinally spaced relationship along each lateral edge of said flat bed; means affixed to said studs that underlie said bed and engage portions of the lower surface thereof; a plurality of elongated rigid members capable of being longitudinally positioned parallel to the lateral edges of said bed, and each of said members provided with means to removably engage said threaded studs situated on the side of said bed on which said member is positioned; manually operable threaded means that engage said studs, with said means when rotated in one direction forcing said members downwardly to grip said braces between the upper surface of said bed and the lower surfaces of said members to hold said bin in a rigid position on said bed, and when rotated sufficiently in the opposite direction moving vertically to permit said members to be removed from said bed; a plurality of vertically adjustable leg members, with each of said leg members slidably supported from said corner posts in a position that overhangs said bed when said bin is mounted thereon, and of sufficient length to stand on the ground to support said bin after said bed and bin have been moved relative to one another in a vertical direction to cause their separation; and locking means to hold said leg member in a downwardly extending position to support said bin when said bed is removed from a bin supporting position, and to maintain said leg members in an elevated position when said bin is removably supported on said bed.

9. A portable structure of the class described capable of being removably mounted on the flat bed of a vehicle which includes: a rectangular storage bin having four generally vertical corner posts affixed to the corners of said bin; a plurality of horizontal braces supported from and extending inwardly from said corner posts, with said braces capable of resting on the upper surface of said flat bed to support the weight of said bin thereon; a plurality of substantially vertical members capable of being disposed in longitudinally spaced relationship along each lateral edge of said flat bed; means affixed to the lower end portions of said members that underlie said bed and engage portions of the lower surface thereof; a plurality of elongated rigid members capable of being longitudinally positioned parallel to the lateral edges of said bed to rest on a portion of said braces and each of said elongated members adapted to removably engage said vertical members situated on the side of said bed on which said elongated member is positioned; manually operated means operatively associated with said vertical members which may be actuated to grip said braces between said elongated members and said bed to maintain said bin in a rigid transporting position on said bed, and said manually operated means capable of being moved upwardly relative to said vertical members whereby said braces are free to move vertically and said bin can be removed from said bed; a plurality of vertically adjustable leg members, with each of said leg members slidably supported from said bin in a position that overhangs said flat bed on which said bin is mounted, and of sufficient length to stand on the ground to support said bin after said bed and bin have been moved relative to one another in a vertical direction to cause their separation; and locking means to hold said leg member in a downwardly extending position to support said bin when said bed is removed from a bin supporting position, and to maintain said leg members in an elevated position when said bin is removably supported on said bed, and means to prevent said leg members from becoming inadvertently separated from said bin.

10. A portable structure of the class described capable of being removably mounted on the flat bed of a vehicle which includes: a generally rectangular storage bin; four generally vertical corner posts affixed to said bin and extending downwardly therefrom; a plurality of horizontal braces extending inwardly from said corner posts, with said braces capable of resting on the upper surface of said flat bed to support the weight of said bin thereon; a plurality of substantially vertical threaded studs capable of being disposed in longitudinally spaced relationship along each lateral edge of said flat bed; engaging means affixed to the lower end portions of said members that underlie said bed and engage portions of the lower surface thereof; a plurality of elongated rigid members capable of being longitudinally positioned parallel to the lateral edges of said bed after said bin is removably mounted thereon, and each of said members provided with means to removably engage said threaded studs situated on the side of said bed on which said member is positioned; manually operable threaded means that engage said studs, with said means when rotated in one direction forcing said members downwardly to grip said braces between the upper surface of said bed and the lower surfaces of said members to hold said bin in a rigid position on said bed, and when rotated sufficiently in the opposite direction becoming disengaged from said studs to permit said members to be removed from said bed; a plurality of vertically adjustable leg members, with each of said leg members movably supported from said bin in a position that overhangs said flat bed of a vehicle on which said bin is mounted and of sufficient length to stand on the ground to support said bin after said bed and bin have been moved relative to one another in a vertical direction to cause their separation; and locking means to hold said leg member in a downwardly extending position to support said bin when said bed is removed from a bin supporting position, and to maintain said leg members in an elevated position when said bin is removably supported on said bed.

11. A portable structure of the class described capable of being removably mounted on the flat bed of a vehicle which includes: a generally rectangular storage bin; four corner posts affixed to said bin and extending along the vertical corners thereof, and each of said corner posts having an outwardly extending horizontal off-set member on the lower end thereof that supports said bin when said bin is removably mounted on said bed; a plurality of vertically adjustable leg members, with each of said leg members movably supported from the outer end portions of one of said off-set members in a position to overhang said flat bed of a vehicle on which said bin is removably mounted, and of sufficient length to stand on the ground to support said bin after said bed and bin have been moved relative to one another in a vertical direction to cause their separation; a plurality of substantially vertical members capable of being disposed in longitudinally spaced relationship along each lateral edge of said flat bed; a plurality of elongated rigid members capable of being longitudinally positioned parallel to the lateral edges of said bed after said bin is removably mounted thereon, and each of said elongated members provided with means adapted to removably engage said vertical members situated on the side of said bed on which said elongated members are positioned; and manually operated means operatively associated with said vertical members which may be actuated after said elongated members are in engagement with said vertical members to force said elongated members downwardly to grip said off-set members between said elongated members and said bed to maintain said bin in a rigid transporting position thereon, and said manually operated means capable of being removed from operative association with said vertical members to permit said elongated members to be disengaged from said vertical members whereby said off-set members are free to move vertically, and said bin can be removed from said bed.

References Cited in the file of this patent

UNITED STATES PATENTS

| Number | Name | Date |
| --- | --- | --- |
| 608,310 | Tanner | Aug. 2, 1898 |
| 1,329,956 | Calataynd et al. | Feb. 3, 1920 |
| 1,425,965 | Hocke | Aug. 15, 1922 |
| 1,443,594 | Saives | Jan. 30, 1923 |
| 1,526,527 | Butler | Feb. 17, 1925 |
| 1,632,103 | Venable | June 14, 1927 |
| 1,964,894 | Rohne | July 3, 1934 |
| 2,019,656 | Corby et al. | Nov. 5, 1935 |
| 2,304,622 | Barrett | Dec. 8, 1942 |